United States Patent
Haserodt et al.

(10) Patent No.: US 12,391,367 B2
(45) Date of Patent: Aug. 19, 2025

(54) DRIVE ASSEMBLY FOR DRIVING A MOVABLE FLOW BODY OF AN AIRCRAFT

(71) Applicant: Airbus Operations GmbH, Hamburg (DE)

(72) Inventors: Jan Haserodt, Hamburg (DE); Sarah Dehnbostel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/411,179

(22) Filed: Jan. 12, 2024

(65) Prior Publication Data
US 2024/0239476 A1    Jul. 18, 2024

(30) Foreign Application Priority Data
Jan. 16, 2023    (EP) ..................... 23151786

(51) Int. Cl.
*B64C 13/50*    (2006.01)
*B64C 13/30*    (2006.01)
(Continued)

(52) U.S. Cl.
CPC .............. *B64C 13/50* (2013.01); *B64C 13/30* (2013.01); *B64C 13/32* (2013.01); *B64C 13/34* (2013.01)

(58) Field of Classification Search
CPC ....... B64C 13/30; B64C 13/50; B64C 13/503; B64C 13/504; B64C 13/505; B64C 13/506; B64C 13/507; H02K 16/02
See application file for complete search history.

(56) References Cited

U.S. PATENT DOCUMENTS

| 3,015,936 A | * | 1/1962 | Brewer | ..................... F02K 1/60 |
| | | | | 239/265.19 |
| 4,004,537 A | * | 1/1977 | Nilsson | .................. B63H 25/16 |
| | | | | 244/236 |

(Continued)

FOREIGN PATENT DOCUMENTS

EP    1462361 B1    9/2004

OTHER PUBLICATIONS

Extended European Search Report for corresponding European Patent Application No. 23218975.3 dated May 13, 2024.
(Continued)

*Primary Examiner* — Joshua J Michener
*Assistant Examiner* — Michael B. Kreiner
(74) *Attorney, Agent, or Firm* — Greer, Burns & Crain, Ltd.

(57) ABSTRACT

A drive assembly for driving a movable flow body of an aircraft comprises an electric motor having a two sets of independent windings, two motor control electronics units coupled with the windings and a control computer, two actuators couplable with a first or second section of the flow body, a first and a second transmission shaft, wherein the transmission shafts each have a first and a second end, wherein the electric motor is coupled with the first ends of the transmission shafts, wherein the second ends of the transmission shafts are coupled with the respective actuator, and wherein the drive assembly is designed to selectively move and hold the movable flow body into a plurality of extended positions and a retracted position relative to a fixed structural component of the aircraft by selectively moving and holding the first actuator and the second actuator.

17 Claims, 5 Drawing Sheets

(51) Int. Cl.
  *B64C 13/32* (2006.01)
  *B64C 13/34* (2006.01)

(56) References Cited

U.S. PATENT DOCUMENTS

| | | | | | |
|---|---|---|---|---|---|
| 4,434,389 | A | * | 2/1984 | Langley | H02K 29/08 |
| | | | | | 318/400.41 |
| 6,020,711 | A | * | 2/2000 | Rubertus | H02K 19/00 |
| | | | | | 318/254.2 |
| 6,755,375 | B2 | * | 6/2004 | Trikha | B64C 13/505 |
| | | | | | 91/509 |
| 6,824,099 | B1 | * | 11/2004 | Jones | B64C 13/28 |
| | | | | | 244/99.2 |
| 6,924,574 | B2 | * | 8/2005 | Qu | H02K 21/12 |
| | | | | | 310/112 |
| 7,048,234 | B2 | | 5/2006 | Recksiek et al. | |
| 7,549,605 | B2 | * | 6/2009 | Hanlon | B64C 13/505 |
| | | | | | 244/75.1 |
| 8,814,085 | B2 | * | 8/2014 | Richter | B64D 45/0005 |
| | | | | | 244/225 |
| 8,818,573 | B2 | * | 8/2014 | Goupil | B64D 45/0005 |
| | | | | | 701/3 |
| 9,303,743 | B2 | * | 4/2016 | Wingett | F16H 25/2204 |
| 10,892,672 | B2 | * | 1/2021 | Meinke | H01F 1/0576 |
| 11,390,378 | B2 | * | 7/2022 | Hinderhofer | B64C 25/42 |
| 11,715,948 | B2 | * | 8/2023 | Perkinson | H02J 1/12 |
| | | | | | 307/9.1 |
| 2006/0289696 | A1 | | 12/2006 | Hanlon et al. | |
| 2013/0026287 | A1 | | 1/2013 | Goupil et al. | |
| 2020/0156766 | A1 | * | 5/2020 | Tzabari | B64C 9/02 |

OTHER PUBLICATIONS

European Search Report for corresponding European Patent Application No. 23151786.3 dated Jun. 22, 2023.

* cited by examiner

DRIVE ASSEMBLY FOR DRIVING A MOVABLE FLOW BODY OF AN AIRCRAFT

CROSS-REFERENCES TO RELATED APPLICATIONS

This application claims the benefit of European Patent Application Number 23151786.3 filed on Jan. 16, 2023, the entire disclosure of which is incorporated herein by way of reference.

FIELD OF THE INVENTION

The invention relates to a drive assembly for driving a movable flow body of an aircraft movable, a drive system for a plurality of movable flow bodies, a high lift system having such a drive system, a wing, and an aircraft.

BACKGROUND OF THE INVENTION

For increasing the lift coefficient of a wing of an aircraft, high-lift systems are known. These often include trailing edge flaps and movable leading-edge devices, which are selectively operable. For example, they are usually activated during takeoff and landing, i.e., moved from a retracted into an extended position.

Trailing-edge flaps of high-lift systems in commercial passenger aircraft are often driven by a single drive unit located in the center of the aircraft's fuselage, wherein the drive unit is often referred to as a "power control unit" (PCU). The PCU often comprises two motors acting in parallel, the drive power of which is transmitted to the respective transmission shaft system via a differential, whereby several drive types exist. A left hand and a right-hand transmission shaft system extend from the PCU into the left- or right-hand wing and are and are coupled with local mechanical actuating devices at corresponding flap stations. Commonly, these actuators are often provided in the form of linear ball screw actuators or geared rotary actuators. At the outboard ends of the transmission shaft systems, safety brakes are often provided, which are often referred to as "wing tip brakes" (WTB). Commonly, high-lift systems are controlled and monitored through a control computer, such as a "Slat Flap Control Computer" (SFCC).

Starting from the PCU, synchronization between individual flaps of a left and a right wing as well as between the flaps of a wing is provided via the transmission shaft systems. Due to their lengths and course inside the wings, often a large number of bearings, cardan joints and couplings are provided.

For providing different extension movements of inboard and outboard flaps, it is known to include an active differential gear box between inboard and outboard flaps between two coupled transmission shaft sections of the same wing. However, this is a complex component to enable differential flap settings function in a centralized system.

EP 1 462 361 B1 and U.S. Pat. No. 7,048,234 B2 show a flap system on the wing of a fixed-wing aircraft in which system flaps are coupled to synchronized wing-internal individual drives.

SUMMARY OF THE INVENTION

It is an object of the invention to propose an alternate drive system or drive assembly, which allows differential flap settings with a reduced mechanical complexity.

This object may be met by a drive assembly for driving a movable flow body of an aircraft having the features of one or more embodiments described herein. Advantageous embodiments and further improvements may be gathered from the following description.

A drive assembly for driving a movable flow body of an aircraft is proposed, comprising an electric motor having a first set of windings and a second set of windings, wherein the first set and the second set are independent from each other, a first motor control electronics unit coupled with the first set of windings and a control computer, a second motor control electronics unit coupled with the second set of windings and the control computer, a first actuator couplable with a first section of the movable flow body, a second actuator couplable with a second section of the same movable flow body, a first transmission shaft, and a second transmission shaft, wherein the transmission shafts each have a first end and a second end, wherein the electric motor is coupled with the first ends of the first transmission shaft and of the second transmission shaft to rotate both transmission shafts synchronously, wherein the second end of the first transmission shaft is coupled with the first actuator, wherein the second end of the second transmission shaft is coupled with the second actuator, and wherein the drive assembly is designed to selectively move and hold the movable flow body into a plurality of extended positions and a retracted position relative to a fixed structural component of the aircraft by selectively moving and holding the first actuator and the second actuator.

The drive assembly according to the invention relates to an apparatus or a group of components that are associated with a single movable flow body. This means, that one drive assembly is associated with and capable of driving one dedicated flow body. Using a plurality of these drive assemblies allows to move a plurality of flow bodies on a wing half or on two wing halves of the respective aircraft independently. A central drive unit and a set of transmission shaft systems are thus not required.

The movable flow body may preferably be a trailing-edge component on a wing of an aircraft, which is extendable relative to a fixed wing part of the aircraft. However, it may also refer to a leading-edge component of a wing.

The movable flow body may comprise a first section and a second section arranged at a spanwise distance to each other. The sections are couplable with one of the first actuator and the second actuator each. Thus, the flow body may be driven through both synchronously moving actuators on a course that is defined by a support of the movable flow body. For example, by moving the flow body further away from the fixed wing part of the aircraft, i.e., into an extended position, the wing surface area as well as the camber increases. Moving the flow body into the retracted position leads to a clean wing.

The electric motor is preferably realized in the form of a DC motor. Preferably, it is a brushless motor. It may, for example, be supplied with electrical power from at least one high voltage DC bus (HVDC). Due to the use of two separate and independent sets of windings, the electric motor is a redundant device. Each of the sets of windings is connected to a dedicated motor control electronics (MCE) unit. It is feasible to connect both MCE units to two independent HVDC buses. For example, one of the MCE units may be connected to a first HVDC bus, the other one of the MCE units may be connected to a second HVDC bus. Also, both MCE units may be permanently or selectively connected to both the first and the second HVDC bus. Hence, the function of moving the flow body can be maintained even if one HVDC bus and/or one MCE unit and/or one set of windings experiences a restricted function.

In addition to providing a level of redundancy, the use of redundant windings may also improve the efficiency and performance of the electric motor. Because each set of windings can be controlled independently, the electric motor can be operated in a way that optimizes its efficiency and power output. This may be particularly useful for operating the electric motor at high speeds or under heavy loads.

An MCE unit may be understood as a device that is used to control the speed and direction of the electric motor. It may comprise a power circuit, which provides the necessary power to the electric motor, and a control circuit, which processes control signals and adjusts the power to the electric motor accordingly. The design of the power circuit may depend on a number of factors, including the type of electric motor being used, the power requirements, and the specific application. It may comprise a switching device, such as a transistor or a MOSFET, which is used to control the flow of current to the electric motor. In addition, it may comprise an overcurrent protection device and filtering components.

Both MCE units are connected to the control computer and receive signals to initiate an operation of the electric motor. The MCE unit, in particular its control circuit, may also include various sensors and feedback mechanisms to monitor the performance of the electric motor and ensure its proper operation. Furthermore, the MCE units may also comprise control and monitoring logics for local monitoring tasks. Also, they may act as remote data concentrators if sensors (see further below) are connected to the MCE units. In this case, the MCE units may deliver the data to a data network, to which they may then connected.

The MCE units may be arranged near the respective electric motor. However, they may also be placed in a further distance from the electric motor, such as in a flap-track-fairing.

The actuators are coupled to the electric motor through the first or the second transmission shaft. They are preferably designed to transform a rotary motion of the respective transmission shaft into a linear motion to drive the associated section of the flow body. For example, the actuators may comprise a linear actuator, such as a ball screw actuator. However, they may also comprise a rotary actuator, such as a geared rotary actuator, that provides a rotary motion for swiveling a lever or a similar component. Due to the connection of both actuators to the electric motor, they are driven synchronously and thus always provide the same amount of motion.

Both transmission shafts are used for transferring mechanical power from the electric motor to the respective actuator. Each actuator is thus associated with one of the transmission shafts. The electric motor may be arranged in a fixed wing part of the respective aircraft substantially in the center between both sections and the transmission shafts extends from one side of the electric motor to the respective actuator.

The transmission shafts are provided in the form of short, isolated shafts, which exclusively extend from the electric motor to the respective actuator. They may be coupled to each other through a shaft of the motor. The first end of both transmission shafts is connected to the motor shaft, while the second end of both transmission shafts is connected to the respective actuator. This clearly distinguishes from above-mentioned transmission shaft systems, where the transmission shaft is created by a plurality of shaft sections extending through substantially the whole wing in a spanwise direction.

Compared to a centralized high lift system having a PCU, the drive assembly according to the invention neither has a mechanical link between the left-hand wing half and the right-hand wing half and also not between movable flow bodies on the same wing half. For an aircraft, instead of the PCU several such drive assemblies would be required to move all desired flow bodies, such as trailing-edge flaps, and would provide the capability of performing a differential flap setting function by design, for instance to provide lateral trim. As a further key feature the drive assembly according to the invention still maintains a mechanical link between two driven support stations of a single flap or another movable flow body to synchronize the movement of the two actuators to avoid force fighting on the movable flow body.

The drive assembly according to the invention has multiple advantages. For example, a better physical integration feasibility is possible due to fewer parts and the eliminated transmission shaft routing between flaps and from the center of the aircraft fuselage to inboard flaps. Fewer parts result in a weight saving on system level, an installation time saving and in lower drag of the system reducing the necessary power to operate the high lift system. Furthermore, the architecture provides the capability for the differential flap setting function by design.

In an advantageous embodiment, the first transmission shaft and the second transmission shaft are designed as flexible shafts. A flexible shaft is a type of mechanical component that is designed to transmit rotary motion from one point to another while being able to bend or flex along its length. This allows to accommodate changes in the alignment or orientation of the two points. The electric motor may comprise a motor shaft that protrudes from two axial sides of the electric motor. One of the transmission shafts may be connected to the motor shaft on one axial side, the other one of the transmission shafts may be connected to the motor shaft on other axial side. Both transmission shafts may extend along a straight or non-straight course to the respective actuator. Hence, a complex arrangement of rigid transmission shafts in combination with axial and rotary joints is not required.

In an advantageous embodiment, at least one position pickup unit is coupled with at least one of the transmission shafts and/or the electric motor, wherein the at least one position pickup unit is coupled with the control computer. Coupling the position pickup unit with the control computer may be conducted either directly or through the MCE units. The position pickup units may either provide an analogue or digital signal. For example, both the transmission shafts may be equipped with a separate position pickup unit, i.e., a first position pickup unit and a second position pickup unit. They may also be referred to as position sensors, which are devices used to monitor the position of the transmission shafts and, consequently, of the respective actuator and the movable flow body. Instead and/or in addition thereto, the electric motor may be coupled with a position pickup unit, which monitors the rotational position of the electric motor. The at least one position pickup unit comprises a sensor, such as a potentiometer or a position encoder, and a device that sends position information to the control computer. The measured position information is used to ensure that the respective flow body is placed in the desired position for take-off and landing, and to provide feedback for the pilots or automatic flight control system.

In an advantageous embodiment, at least one position pickup unit is coupled with at least one of the first and second actuators; and the at least one position pickup unit is coupled with the control computer. The term "coupled with" may also mean "arranged at", "arranged on", "located inside" and the like. The at least one position pickup unit (which may also be referred to as position sensor) may for example be a linear position sensor within a linear actuator or a rotary sensor within a rotary actuator. The coupling with the control computer is as defined above. If a position pickup unit is coupled with or arranged in at least one of the first and second actuators, this may mean that an actuator comprises the at least one position sensor and that, for example the position sensor is located inside the actuator.

In an advantageous embodiment, the at least one position pickup unit is a single position sensor. Thus, the arrangement can be a single position sensor in each actuator. According to an example, the arrangement can also be one single position sensor in only one of the first and second actuators.

In an advantageous embodiment, the at least one position pickup unit is a redundant position sensor.

According to an example, one of the first or the second actuators may be coupled with a redundant position sensor. That is, only one of the actuators comprises one redundant position sensor.

According to a further example, a redundant position sensor is provided in each actuator, i.e. both the first and the second actuators each are coupled with a position pickup unit which is a redundant position sensor. A "redundant position sensor" means that there are two position sensors of which each one provides its signal, for example via one connected signal channel.

It is also conceivable that one actuator comprises a single position sensor and the other actuator comprises a redundant position sensor.

All arrangements with a position pickup unit coupled with at least one of the actuators have the advantageous effect of measuring directly the actuator position instead of measuring the transmission position and thus, an even higher accuracy can be achieved.

In an advantageous embodiment, the first actuator and/or the second actuator comprises a linear ball screw actuator. Thus, the actuators use a ball screw mechanism to convert rotary motion delivered by the respective transmission shaft into a linear motion. Such a type of actuator may comprise a ball screw that is rotatably supportable in a fixed wing part and driven by the respective transmission shaft. A nut engages with the ball screw and is mechanically couplable with the movable flow body at its respective section. The nut will travel along the longitudinal extension of the ball screw and is thus a linear actuator. This design leads to a high precision motion and a superior reliability.

In an advantageous embodiment, the first actuator and/or the second actuator comprises a geared rotary actuator. Thus, the actuators comprise a gear train having a plurality of gears, wherein the gear train is driven through the respective transmission shaft. The gears may provide a reduction ratio. The geared rotary actuator may comprise a rotating element, which is coupled to a lever, which in turn is coupled to the respective section of the movable flow body. Such an actuator is also commonly used in aircraft and is able to provide a precise and reliable control of the movable flow body.

In an advantageous embodiment, the first actuator and/or the second actuator comprises a no-back device and/or a power-off brake adapted to prevent the flow body from moving when the electric motor is stopped. Such a no-back device or power-off brake is a mechanical component that is used to prevent the movable flow body from moving when the electric motor that drives it is stopped. A no-back device typically consists of a brake or other mechanical mechanism that at least engages when the power is turned off or when it is not actively disengaged. The no-back device shall engage the brake in a retract position, such that the electric motor needs to pull actively against the brake and shall disengage in an extend direction, such that the electric motor only drives against the air loads.

In an advantageous embodiment, the electric motor may comprise a power-off brake to arrest the drive assembly before and after a drive sequence. Thus, the first and second transmission shafts and, consequently, the first and second actuator, will be arrested when the electric motor is stopped. The power-off brake of the electric motor may be provided in addition to no-back devices or power-off brakes on the transmission shafts mentioned above.

In an advantageous embodiment, the actuators comprise a rotary input having a rotational axis transverse to a rotational axis of the electric motor. For example, the electric motor may be aligned with a spanwise axis of the wing inside the fixed wing part. Its integration is thus very space efficient. The flexible transmission shafts allow to transfer the rotary motion from the spanwise rotational axis to a rotational axis that may be aligned substantially parallel to the longitudinal axis of the aircraft or perpendicular to the spanwise axis.

At the second ends of the transmission shafts, i.e. at the rotary inputs, a bevel gear stage may be provided in the actuators to not only route the rotational motion from a spanwise to a chordwise direction via a flexible shaft, but by a combination of a flexible shaft bending and the gear stage in the respective actuator.

In an additional option, the rotational axis of the rotary input and the rotational axis of the electric motor enclose an angle in a range of 45° to 135°. The flexible transmission shafts allow the transfer of rotational motion in this angle range by bending. The angle range reflects the alignment of the electric motor parallel to the spanwise axis and the rotary input of the actuators parallel to the longitudinal axis or transverse to the spanwise axis with a swept wing.

The invention further relates to a drive system, comprising a plurality of drive assemblies according to the above, wherein the drive assemblies are independent from each other, such that individual flow bodies are movable independently from each other. For example, the drive system may comprise an even number of drive assemblies, in order to provide a symmetrical arrangement on two wing halves. In particular, the drive system may comprise four drive assemblies for moving four movable flow bodies, in particular trailing-edge flaps.

The invention also relates to a high lift system, comprising at least one drive system according to the above and/or at least one drive assembly according to the explanation further above and at least one movable flow body coupled with the at least one drive system and/or the at least one drive assembly.

In an additional option, the high lift system is a trailing-edge flap high lift system.

Still further, the invention relates to a wing, comprising at least one such high lift system.

Lastly, the invention relates to an aircraft, comprising at least one wing according to the above, and/or at least one high lift system according to the above and/or at least one drive system according to the above and/or at least one drive assembly according to the above.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show.

DETAILED DESCRIPTION OF THE PREFERRED EMBODIMENTS

Figure 1:
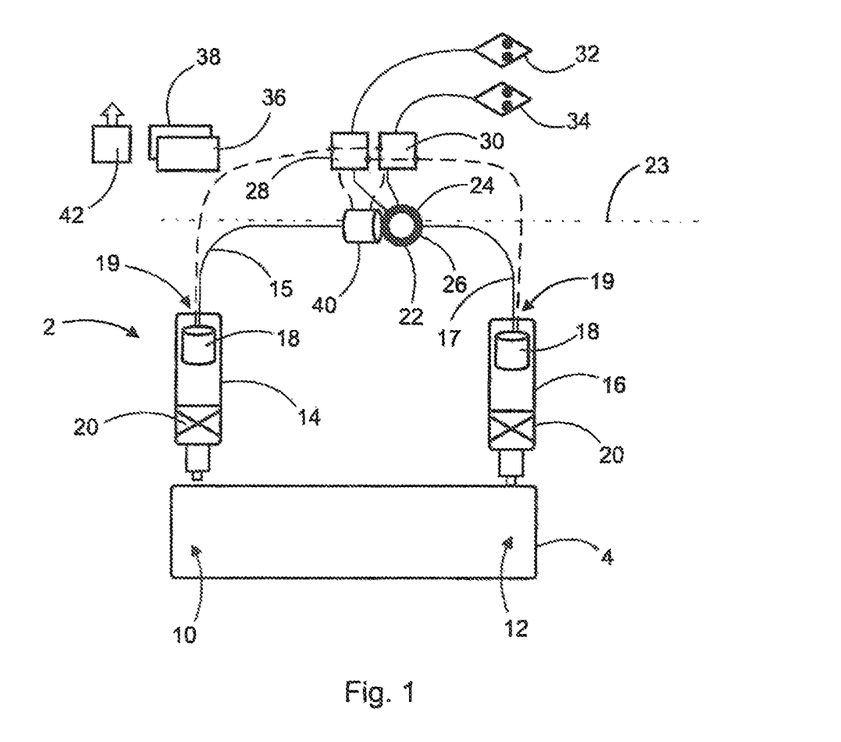
FIG. 1 shows a schematic view of a drive assembly.

FIG. 1 shows a drive assembly 2 for driving a movable flow body 4, which is shown in form of a trailing-edge flap. Such a movable flow body 4 is movably supported on a fixed wing part 6 of an aircraft 8 shown in FIG. 2. The drive assembly 2 is exclusively associated with a single flow body 4, such that for moving a plurality of flow bodies 4, several drive assemblies 2 are required.

The movable flow body 4 comprises a first section 10 and a second section 12, i.e., positional regions, which are arranged at a distance to each other in a spanwise direction. A first actuator 14 is coupled with the flow body 4 in the first section 10. A second actuator 16 is coupled with the second section 12 of the movable flow body 4.

Exemplarily, both actuators 14 and 16 are provided in the form of a ball screw actuator, i.e., a mechanical linear actuator, which has an integrated load sensor 18 as well as a no-back device 20, which is only schematically shown. These transform a rotational motion into a translational motion.

Both actuators 14 and 16 are driven by an electric motor 22, which comprises a first set of windings 24 and a second set of windings 26, which are independent from each other. Both windings 24 and 26 are coupled with a motor control electronics (MCE) unit 28 and 30, respectively. The first MCE unit 28 is coupled with a first electrical power supply 32 and the second MCE unit 30 is coupled with a second electrical power supply 34. Both power supplies are redundant. They may be realized in the form of a high voltage DC bus or an AC bus each. Hence, the electric motor 22 is supplied with power from two independent power supplies and allows a safe operation even if one of the components, i.e., a set of windings 24 or 26, or an MCE unit 28 or 30, experiences a restricted function.

The electric motor 22 may or may not comprise an additional power-off brake.

To transfer the mechanical power from the electric motor 22 to the first actuator 14, a first transmission shaft 15 is provided. In analogy, mechanical power is transferred to the second actuator 16 through a second transmission shaft 17. Both transmission shafts 15 and 17 are provided as flexible shafts, which allow a simple change of orientation of the rotation and a compensation of temperature-induced changes in length.

Exemplarily, the electric motor 22 comprises a rotational axis 23, which is aligned substantially parallel to a spanwise axis 25 of the respective wing of the aircraft 8. The actuators 14 and 16 each comprise a rotary input 19, which is exemplarily arranged parallel to the longitudinal axis x of the aircraft 8. Thus, the ends of the transmission shafts 15 and 17 enclose an angle of exemplarily 55° or 125° at a wing sweep angle of 35°.

A first control computer 36 and a second control computer 38 are coupled with one of the MCE units 28 and 30 each, in order to control operation of the electric motor 22. Both control computers 36 and 38 may be referred to as SFCCs (Slat Flap Control Computer). In addition, the electric motor 22 is coupled with a position pickup unit, or position sensor, 40, which in turn is exemplarily connected to the MCE units 28 and 30 and, consequently, coupled with both control computers 36 and 38. Similarly, the load sensors 18 are exemplarily connected to the MCE units 28 and 30. As stated before, the sensors 18 and 40 may also be directly connected to a data network.

An input device 42, such as a flight lever, is exemplarily connected to the flight control computers 36 and 38 to signalize a motion of the flow body 4, initiating operation of the electric motor 22 and to monitor the position through position pickup unit 40 as well as the loads on the actuators 14 and 16 through the load sensors 18.

Figure 3:
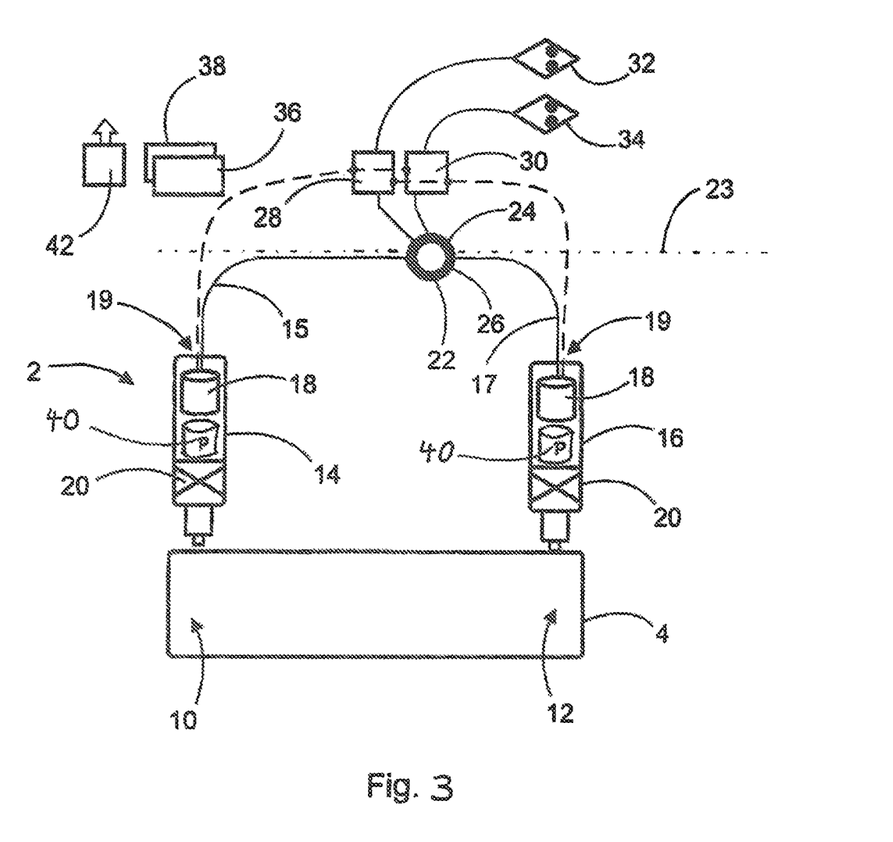
FIG. 3 shows another schematic view of a drive assembly.
Figure 4:
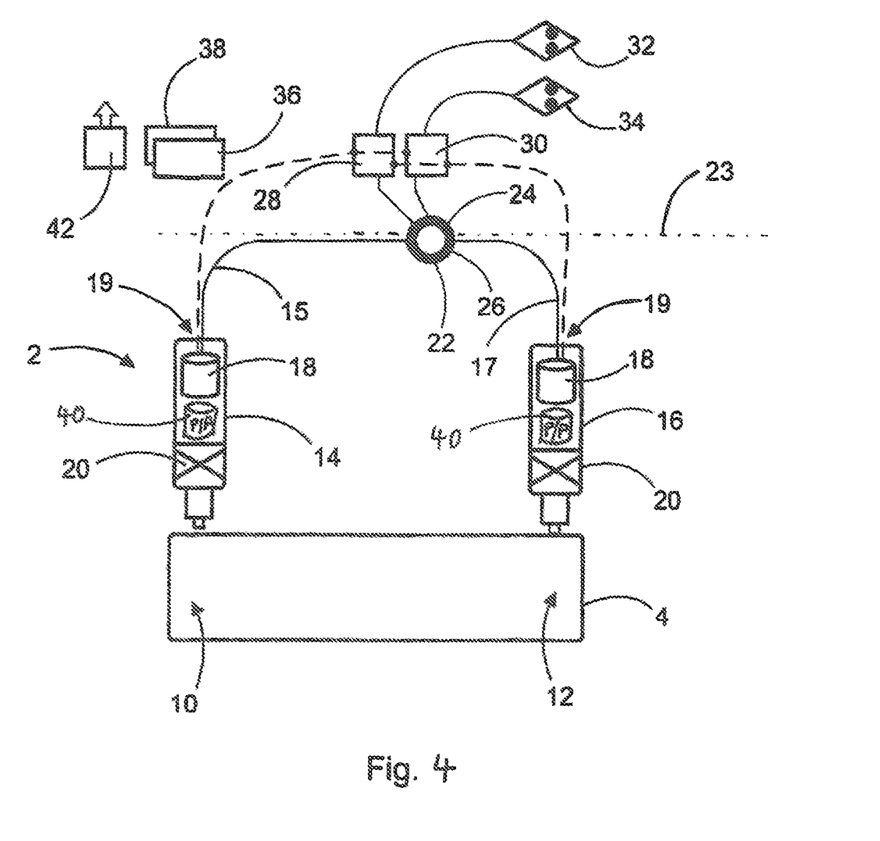
FIG. 4 shows a further schematic view of a drive assembly.
Figure 5:
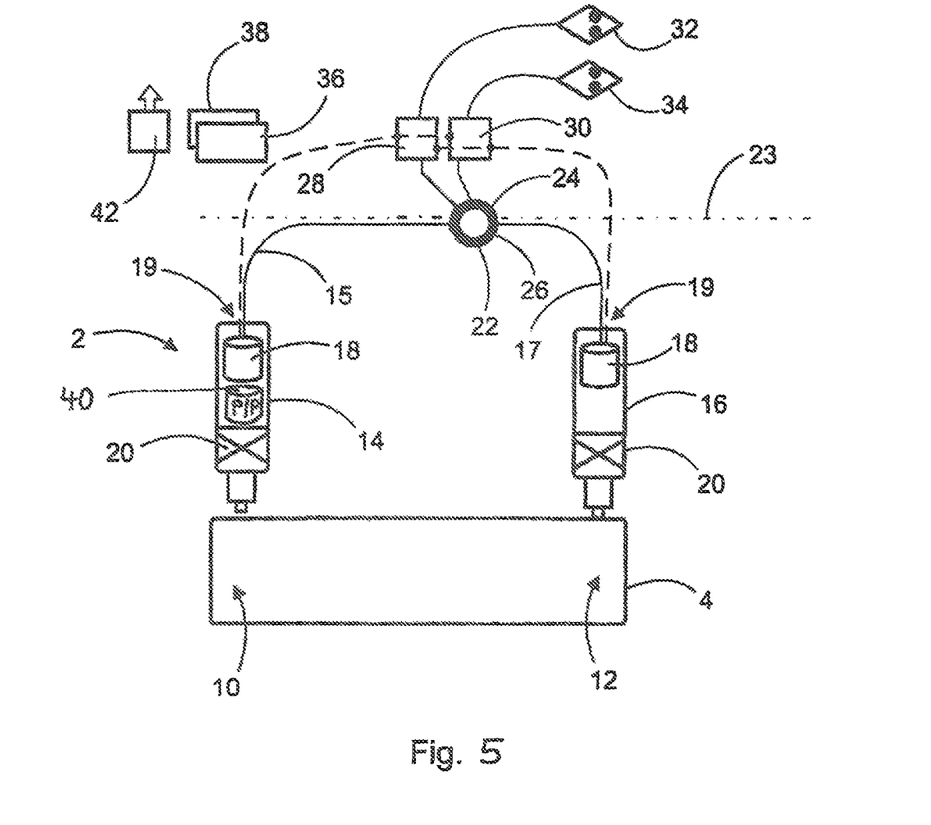
FIG. 5 shows yet another schematic views of a drive assembly.

FIGS. 3, 4 and 5 show further examples of a drive assembly 2 for driving a movable flow body 4, wherein the position pickup unit 40 (position sensor) is moved into the actuators 14 and 16.

FIG. 3 shows an example of a drive assembly 2, wherein a single position sensor "P" (as a position pickup unit 40) is within each actuator 14 and 16. This would deliver the same redundancy as in the arrangement of FIG. 1.

FIG. 4 shows a further example of a drive assembly 2, wherein a redundant position sensor "P/P" (as a position pickup unit 40) is within each actuator 14 and 16.

FIG. 5 shows a further optional arrangement of a drive assembly 2, wherein one redundant position sensor "P/P" is located in only one of the two actuators 14 and 16.

Figure 2:
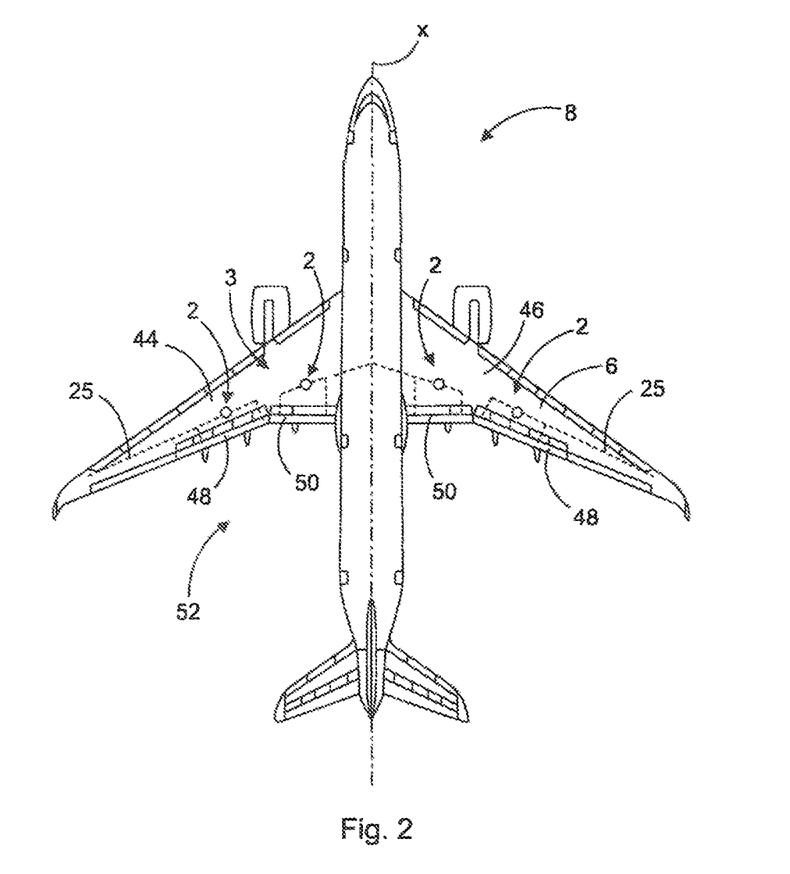
FIG. 2 shows a schematic view of an aircraft having a plurality of flaps and associated drive assemblies for driving the flaps.

The aircraft 8 has a left-hand wing-half 44 and a right-hand wing-half 46, which both comprise an outboard flap 48 and an inboard flip 50. The flaps 48 and 50 are provided in the form of the movable flow body 4 and each of the flaps 48 and 50 is driven by a dedicated drive assembly 2. The plurality of drive assemblies 2 constitute a drive system 3. The drive system 3 in combination with the flaps 48 and 50 constitute a (trailing-edge) high lift system 52.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 drive assembly
3 drive system
4 flow body
6 fixed wing part
8 aircraft
10 first section
12 second section
14 first actuator
15 first transmission shaft
16 second actuator
17 second transmission shaft
18 load sensor
19 rotary input
20 no-back device
22 electric motor
23 spanwise axis
24 first set of windings
26 second set of windings
28 first MCE unit
30 second MCE unit
32 first DC bus
34 second DC bus
36 first control computer
38 second control computer
40 position pickup unit
42 input device
44 left-hand wing half
46 right-hand wing half
48 outboard flap
50 inboard flap
52 high-lift system
x longitudinal axis

The invention claimed is:

1. A drive assembly for driving a movable flow body of an aircraft, the drive assembly comprising:
   an electric motor having a first set of windings and a second set of windings, wherein the first set of windings and the second set of windings are independent from each other,
   a first motor control electronics unit coupled with the first set of windings and a control computer,
   a second motor control electronics unit coupled with the second set of windings and the control computer,
   a first actuator configured to be coupled with a first section of the movable flow body,
   a second actuator configured to be coupled with a second section of the same movable flow body,
   a first transmission shaft, and
   a second transmission shaft,
   wherein the first and second transmission shafts each have a first end and a second end,
   wherein the electric motor is coupled with the first end of the first transmission shaft and the first end of the second transmission shaft to rotate both transmission shafts synchronously,
   wherein the second end of the first transmission shaft is coupled with the first actuator,
   wherein the second end of the second transmission shaft is coupled with the second actuator,
   wherein at least one position pickup unit is coupled with, and located within, at least one of the first and second actuators,
   wherein the at least one position pickup unit is coupled with the control computer, and
   wherein the drive assembly is configured to selectively move and hold the movable flow body into a plurality of extended positions and a retracted position relative to a fixed structural component of the aircraft by selectively moving and holding the first actuator and the second actuator.

2. The drive assembly of claim 1, wherein the first transmission shaft and the second transmission shaft are designed as flexible shafts.

3. The drive assembly of claim 1, wherein one of the at least one position pickup unit is coupled with at least one of the first and second transmission shafts, or the electric motor, or both, and
wherein the at least one position pickup unit is coupled with the control computer.

4. The drive assembly of claim 1, wherein the at least one position pickup unit is a single position sensor.

5. The drive assembly of claim 1, wherein the at least one position pickup unit is a redundant position sensor.

6. The drive assembly of claim 1, wherein the first actuator, or the second actuator, or both comprise a linear ball screw actuator.

7. The drive assembly of claim 1, wherein the first actuator, or the second actuator, or both comprise a geared rotary actuator.

8. The drive assembly of claim 1, wherein the first actuator, or the second actuator or both comprises a no-back device, or a power-off brake adapted to prevent the movable flow body from moving when the electric motor is stopped, or both.

9. The drive assembly of claim 1, wherein the electric motor comprises a power-off brake to arrest the drive assembly before and after a drive sequence.

10. The drive assembly of claim 1, wherein the first and second actuators comprise a rotary input having a rotational axis transverse to a rotational axis of the electric motor; and
wherein the rotational axis of the rotary input and the rotational axis of the electric motor enclose an angle in a range of 45° to 135°.

11. A drive system comprising:
a plurality of the drive assembly according to claim 1,
wherein the drive assemblies are independent from each other, such that individual flow bodies are movable independently from each other.

12. A high lift system comprising:
at least one drive system according to claim 11, and
at least one movable flow body coupled with the at least one drive system,
wherein the high lift system is a trailing-edge flap high lift system.

13. A wing comprising:
at least one high lift system of claim 12.

14. An aircraft comprising:
at least one wing of claim 13.

15. The drive assembly of claim 1, wherein the electric motor comprises a rotational axis, which is aligned parallel to a spanwise axis of a respective wing of the aircraft.

16. The drive assembly of claim 1, wherein the first actuator, or the second actuator or both include an integrated load sensor which measures the loads on the first actuator, or the second actuator or both.

17. The drive assembly of claim 1, further comprising a first electrical power supply coupled to the first motor control electronics unit and a second electrical power supply coupled to the second motor control electronics unit, the first and second electrical power supplies being redundant power supplies.

* * * * *